United States Patent [19]

Adriaen

[11] Patent Number: 5,669,423
[45] Date of Patent: Sep. 23, 1997

[54] GEAR FOR DRIVING A RAPIER OF A LOOM

[75] Inventor: Marc Adriaen, Hollebeke, Belgium

[73] Assignee: Picanol N.V., Belgium

[21] Appl. No.: 670,416

[22] Filed: Jun. 26, 1996

[30] Foreign Application Priority Data

Jun. 27, 1995 [BE] Belgium ............................ 9500572

[51] Int. Cl.$^6$ .................................................. D03D 47/12
[52] U.S. Cl. ...................................... 139/449; 74/446
[58] Field of Search .................. 74/445, 446, 447; 139/449

[56] References Cited

U.S. PATENT DOCUMENTS

| | | | |
|---|---|---|---|
| 3,999,445 | 12/1976 | Liautaud | 74/445 |
| 4,458,547 | 7/1984 | Fina | 74/446 |
| 4,564,053 | 1/1986 | van Bogaert | |
| 4,690,177 | 9/1987 | Gerhring et al. | 139/449 |
| 4,696,200 | 9/1987 | Pezzoli | |
| 5,056,623 | 10/1991 | Glasel et al. | 184/7.4 |

FOREIGN PATENT DOCUMENTS

| | | | |
|---|---|---|---|
| 0 504 803 A1 | 9/1992 | European Pat. Off. | |
| 2 572 425 | 5/1986 | France | 139/449 |
| 8616771 U | 10/1986 | Germany | |
| 38 25 259 | 4/1989 | Germany | 139/449 |
| 2 039 662 | 8/1980 | United Kingdom | 74/447 |
| 2 064 708 | 6/1981 | United Kingdom | 74/447 |

*Primary Examiner*—Andy Falik
*Attorney, Agent, or Firm*—Bacon & Thomas

[57] ABSTRACT

A gear (1) for driving a rapier of a loom and composed of a separately manufactured synthetic base body (3, 5) to which a wear-resistant band (9) forming the outside teeth (2) of the gear is bonded by an adhesive (10).

9 Claims, 2 Drawing Sheets

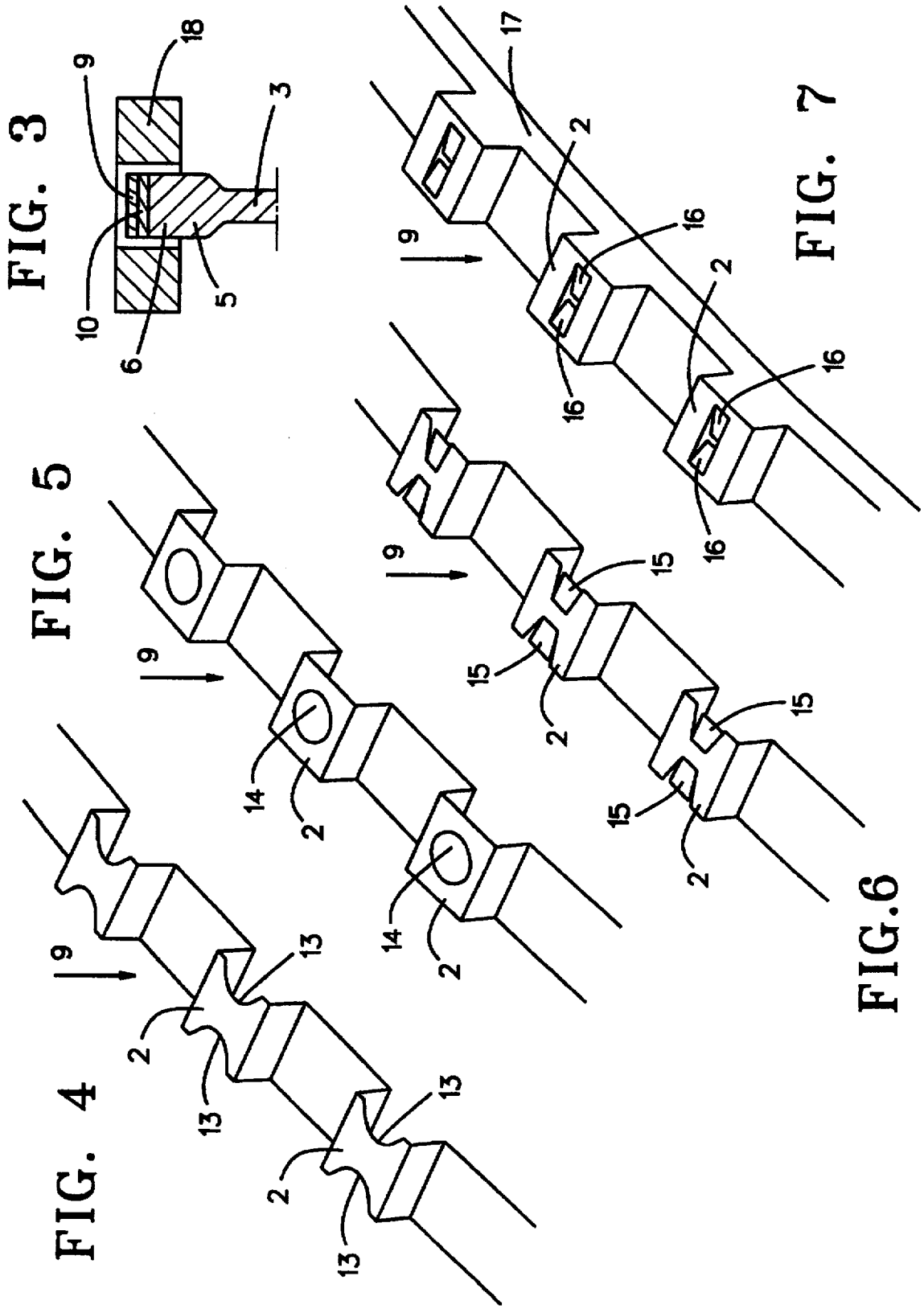

GEAR FOR DRIVING A RAPIER OF A LOOM

BACKGROUND

1. Field of the Invention

The invention relates to a gear for driving a rapier of a loom, the gear comprising a synthetic base body of which the circumference is fitted with an external toothing made of a wear-resistant, band material.

2. Discussion of Related Art

It is known from U.S. Pat. No. 4,564,053 to drive a rapier having recesses by using a gear for displacing a gripper mounted to the end of the rapier into a shed and out of it again. The rapier recesses cooperate with the gear's teeth. Weaving rates being on the increase, attempts have been made to keep the gear's mechanical inertia at a minimum. Because the gear teeth cooperating with the recesses in the rapier incurring wear, these teeth are made as wear-resistant as possible.

To minimize the mass of the gear and hence the inertia, it is known to use light-weight metal or synthetic material for said gear and to implement cutouts in it as appropriate.

A light-metal gear such as aluminum evinces good wear-resistance after an appropriate treatment of the teeth. However the weight and hence the inertia of such a gear is relatively high. Moreover the manufacture of the gear and especially its treatment for achieving wear-resistant teeth are time consuming and hence costly.

A synthetic gear, for instance made of a fiber-reinforced polymer, offers relatively low weight and hence low inertia. But the teeth still evince less than satisfactory wear-resistance even if made by fiber-reinforced synthetic material.

It is known with respect to gears of the initially cited type (see also U.S. Pat. No. 4,696,200; European patent document 0 504 803) to provide a synthetic base body of which the circumference is fitted with an external toothing made of wear-resistant band material. The band material is placed into a casting mold into which the synthetic material then will be poured or injected, as a result of which the base body is integrated with the band material. As a rule however such gears suffer from shape defects which are attributable mostly to the pouring or injection of the synthetic material into the casting mold.

SUMMARY OF THE INVENTION

The objective of the invention is to create a gear which shall be essentially free of shape defects caused by the casting or injection molding of the synthetic base body.

This problem is solved by using an adhesive to affix the band forming the external toothing to the circumference of the separately manufactured base body.

The invention offers the advantage that shape defects in the cast or injection molded base body will not affect the toothing configuration of the gear. By bonding the band onto the base body, the resulting gear's toothing will be only slightly deformable.

In one embodiment of the invention, the circumference of the base body is provided with teeth which are covered by the band at least in the vicinity of their leading edges and their trailing edges. As a result, bonding the band to the base body is easier.

In another embodiment of the invention, a layer of adhesive is present between the inside contour of the band and the outside contour of the teeth of the base body. This layer of adhesive fills gaps between the base body and the band and allows compensation for any shape defects of the base body.

In yet another embodiment of the invention, the teeth of the band are cut out in the region between the teeth leading edges and the teeth trailing edges. As a result, the weight of the gear and its inertia can be reduced.

In yet another embodiment of the invention, the teeth of the base-body are cut out in the region between their leading and trailing edges and are provided with clearances that may be entered by parts of the band to thereby reduce the gear inertia.

In yet a further embodiment of the invention, the band exterior and especially in the region of the leading and trailing edges of the teeth, is provided with a sliding surface. For example, this sliding surface may be a teflon layer deposited by spray painting. This feature enhances the wear resistance of the gear teeth.

BRIEF DESCRIPTION OF THE DRAWINGS

Further advantages and features of the invention are elucidated in the following description of the embodiments and the drawings, in which:

FIG. 3 is a section along line III—III of FIG. 2 of a rapier driven by the gear, and FIGS. 4 through 7 are embodiments of bands forming the outer teeth of the toothing.

DETAILED DESCRIPTION OF PREFERRED EMBODIMENTS

Figure 1:
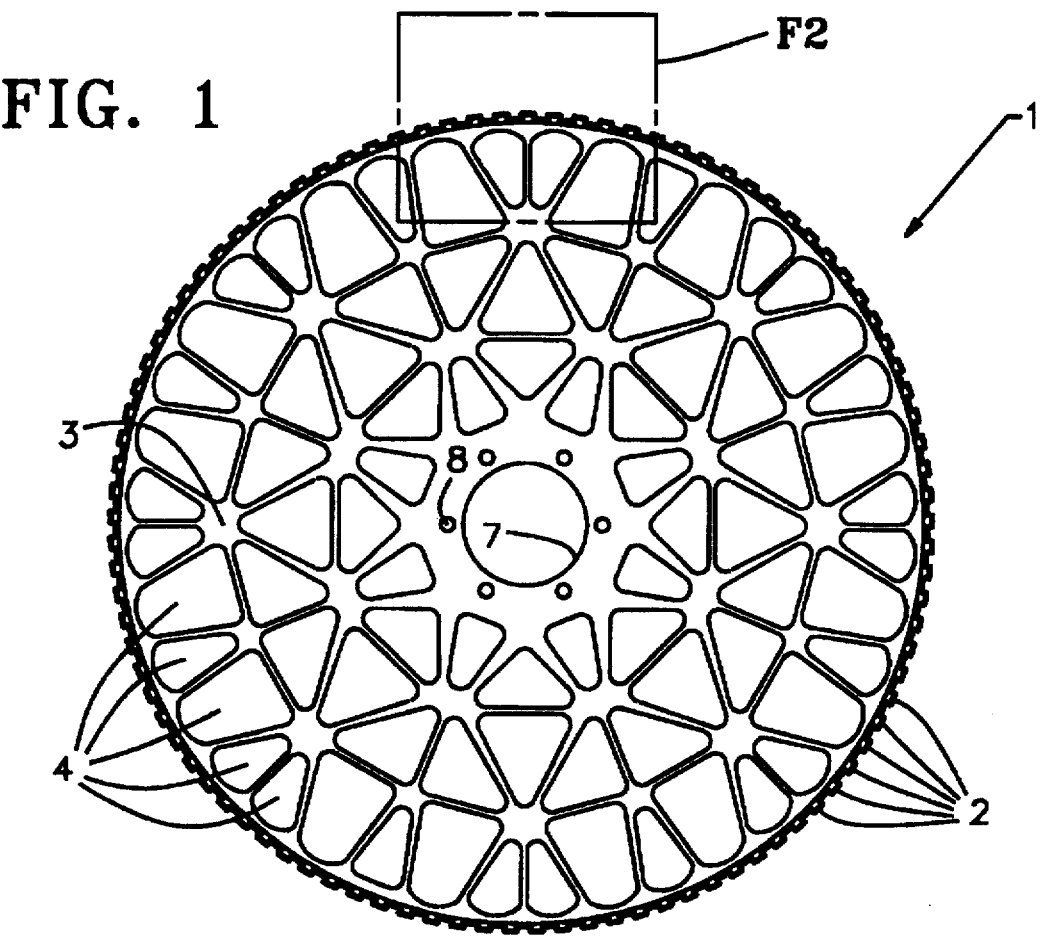
FIG. 1 is a front view of a gear of the invention.
Figure 2:
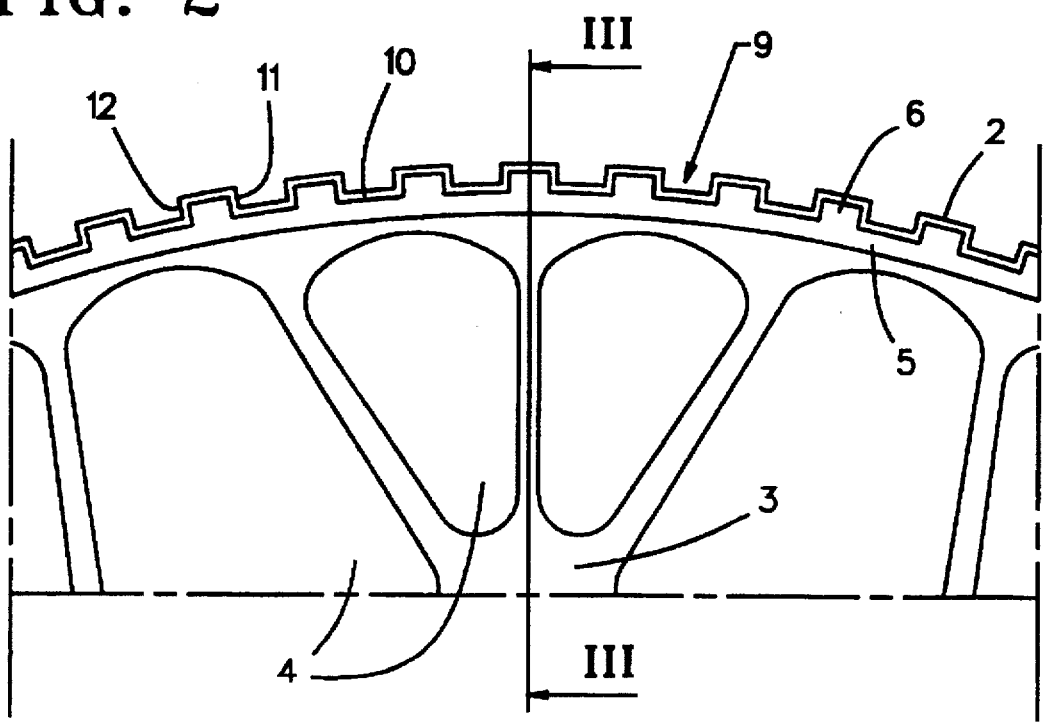
FIG. 2 is the segment F2 of FIG. 1 on an enlarged scale.

The gear shown in FIGS. 1 through 3 drives a rapier 18 (FIG. 3). The gear is composed of an integral synthetic base body comprising a hub with a central hole 7 receiving a (not shown) drive shaft. Aperture 8 for screws affixing the gear 1 to the drive shaft are present near the hub. A disk 3 with a plurality of cutouts 4 joins the hub to a wheel rim 5. The axial width of the disk 3 is less than that of the wheel rim 5. The wheel rim 5 is fitted with inner teeth 6 at its circumference.

The base body is made in a casting mold in particular by casting or by injection molding. The synthetic material is a fiber-reinforced polymer. Reinforcing fibers are carbon fibers for example.

The gear 1 is fitted with a wear-resistant band 9 forming external band teeth 2 cooperating with the rapier 18. The band 9 overlaps the base body in such manner that it substantially covers the wheel rim 5 in the zone of the teeth 6. The wheel rim 5 and the band 9 are bonded together.

The teeth 2 of the band 9 substantially cover the inner or base teeth 6 of the base-body wheel rim 5 and as a result the recesses in the rapier 18 cooperate only with the band teeth 2 of the band 9 evincing comparatively high wear resistance.

The band 9 is made of a wear-resistant material such as a suitable, wear-resistant metal or laminated wear-resistant fibers, for instance kevlar fibers. To further enhance the wear-resistance of that zone of the band 9 which cooperates with the rapier 18, at least this zone of the outer toothing of the band 9 may be provided with a low friction slide-layer. A TEFLON layer for instance may be deposited by spray painting.

An adhesive layer for example 0.2 to 2 mm thick is present between the inner contour of the band 9 and the outer contour of the wheel rim 5. This adhesive layer 10 allows the band teeth 2 to exactly hold their shapes even if the base teeth 6 of the wheel rim 5 were formed inaccurately. This is possible because the thickness of the adhesive layer 10 easily can vary and therefore shape defects in the cast or injection-molded base body are easily compensated so that there is no need for machining or at least not for exactly machining the base body.

The band teeth 2 of the band bonded to the base body are very rigid and this rigidity is substantially independent of the deformability of the band prior to being bonded. Using high-strength adhesive, especially a curing multi-component adhesive, said rigidity may be increased further.

Only the leading edge 11 and the trailing edge 12 of the teeth 2 being significant in driving a rapier 18, only said leading and trailing edges 11 and 12 need be made of wear-resistant band material.

The inertia of a gear 1 is essentially determined by the masses of those parts located in the zones of the largest diameter or radius. Advantageously therefore, the band weight and hence its inertia shall be kept low. For that purpose material may be removed from the top side of the substantially rectangular teeth. Lateral cutouts 13 are present in the embodiment of FIG. 4 and central cutouts 14 in the embodiment of FIG. 5.

In the embodiment of FIG. 6, inward-pointing tabs 15 are present at the top sides of the teeth 2 and enter recesses in the (not shown) base teeth 6 of the wheel rim 5 in interlocking relationship. This feature allows slightly lowering the gear inertia without thereby reducing the adhesive surface between the band 9 and the base body.

In the embodiment of FIG. 7, the band 9 comprises sidewalls 17 whereby the teeth 6 are enclosed as by caps. Recesses are provided at the top side of the (not shown) teeth 6 of the base body and these are entered into in cooperating interlocking relationship by inward pointing tabs 16 of the teeth of the band 9.

Additional affixing means may be provided in all embodiments in order to keep the band 9 on the base body. Such additional means are advantageous in particular if the adhesive is slow-curing.

The gear 1 need not be provided over its full circumference with teeth 2, and instead it may be provided with teeth only over that sector of its circumference which cooperates with a rapier 18. In the event that a rapier cooperates with a gear only over a portion of the circumference, then the circular gear may be replaced by a gear in the form of a circular sector.

Various modifications of the embodiments described can be made without departing from the scope of the invention that is defined in the claims below.

I claim:

1. A gear for driving a rapier of a loom, said gear comprising:

a pre-formed base body made of synthetic material, said base body including peripheral base teeth having leading and trailing edges relative to the driving direction of said gear;

a band having wear-resistant band teeth for engaging said rapier, at least said leading and trailing edges being covered by said band teeth;

said band being adhesively bonded to said base body to form gear teeth on said base body.

2. A gear according to claim 1, including a layer of adhesive bonding material located between said base body and said band, said bonding material adhesively bonding said band to said base body.

3. A gear according to claim 1, wherein said band teeth have leading and trailing edges relative to the drive direction of the gear, and including cutouts in the band teeth between their leading and trailing edges.

4. A gear according to claim 1, wherein said band teeth have leading and trailing edges relative to a drive direction of the gear; said base body having peripheral base teeth at least partially covered by said band teeth; said band teeth including cutouts between their leading and trailing edges; and cooperating elements associated with said cutouts and said base teeth for interlocking said base and band teeth.

5. A gear according to claim 1, wherein the band teeth cover and enclose said base teeth.

6. A gear according to claim 1, wherein at least said leading and trailing edges of said band teeth include a low friction slide-layer.

7. A gear according to claim 1, wherein said base body is formed of fiber-reinforced polymer.

8. A belt according to claim 1, wherein said band is formed of a metal.

9. A belt according to claim 1, wherein said band is formed of a laminated fiber material.

* * * * *